US012314952B2

(12) United States Patent
Blania et al.

(10) Patent No.: US 12,314,952 B2
(45) Date of Patent: *May 27, 2025

(54) COMPUTING SYSTEM FOR DISTRIBUTING CRYPTOCURRENCY

(71) Applicant: Worldcoin Foundation, Georgetown (KY)

(72) Inventors: Alex Blania, Erlangen (DE); Max Novendstern, San Francisco, CA (US); Philipp Sippl, Erlangen (DE); Christian Brendel, Erlangen (DE); Sandro Herbig, Erlangen (DE); Luis Wenus, Erlangen (DE); Shravan Nageswaran, Erlangen (DE)

(73) Assignee: Worldcoin Foundation, Grand Cayman (KY)

( * ) Notice: Subject to any disclaimer, the term of this patent is extended or adjusted under 35 U.S.C. 154(b) by 64 days.

This patent is subject to a terminal disclaimer.

(21) Appl. No.: 17/458,079

(22) Filed: Aug. 26, 2021

(65) Prior Publication Data
US 2023/0068229 A1  Mar. 2, 2023

(51) Int. Cl.
*G06Q 20/40* (2012.01)
*G06F 16/538* (2019.01)
(Continued)

(52) U.S. Cl.
CPC ..... *G06Q 20/40145* (2013.01); *G06F 16/538* (2019.01); *G06Q 20/3276* (2013.01);
(Continued)

(58) Field of Classification Search
CPC ......... G06Q 20/40145; G06Q 20/3276; G06Q 20/367; G06Q 20/3829; G06F 16/538; G06K 7/1417
See application file for complete search history.

(56) References Cited

U.S. PATENT DOCUMENTS 6,957,770 B1 * 10/2005 Robinson ............... G06Q 20/40
235/382
7,367,049 B1 * 4/2008 Robinson ............... G06F 21/32
713/186
(Continued)

FOREIGN PATENT DOCUMENTS

CN          104320414 A   *  1/2015  ............. H04L 67/38

OTHER PUBLICATIONS

Machine translation of Li (reference N above) provided by Google Patents.*

*Primary Examiner* — Jamie R Kucab
(74) *Attorney, Agent, or Firm* — Calfee, Halter & Griswold LLP

(57) ABSTRACT

A computing system receives a code that is generated based upon an image of an iris of a first user. The image of the iris of the first user is captured by way of an iris scanning device that is under control of a second user. The computing system executes a search over a plurality of codes stored in a data store based upon the code, where the plurality of codes are generated based upon images of irises of a plurality of users. The computing system determines whether the code is included in the plurality of codes based upon search results for the search. Based upon a determination that the code is not included in the plurality of codes, the computing system causes an amount of cryptocurrency to be transferred to a cryptocurrency wallet of the second user.

20 Claims, 12 Drawing Sheets

(51) Int. Cl.
*G06Q 20/32* (2012.01)
*G06Q 20/36* (2012.01)
*G06Q 20/38* (2012.01)
*G06K 7/14* (2006.01)

(52) U.S. Cl.
CPC ....... *G06Q 20/367* (2013.01); *G06Q 20/3829* (2013.01); *G06K 7/1417* (2013.01)

(56) References Cited

U.S. PATENT DOCUMENTS

| | | | |
|---|---|---|---|
| 11,559,086 B1* | 1/2023 | Aubert | H04N 23/62 |
| 2013/0124410 A1* | 5/2013 | Kay | G07F 19/211 |
| | | | 705/43 |
| 2018/0232739 A1* | 8/2018 | Battle | G06Q 20/1085 |
| 2018/0331833 A1* | 11/2018 | Tomlinson | H04L 63/0861 |
| 2019/0325407 A1* | 10/2019 | Zhou | G06Q 20/3274 |
| 2021/0224795 A1* | 7/2021 | Song | G06Q 20/027 |

* cited by examiner

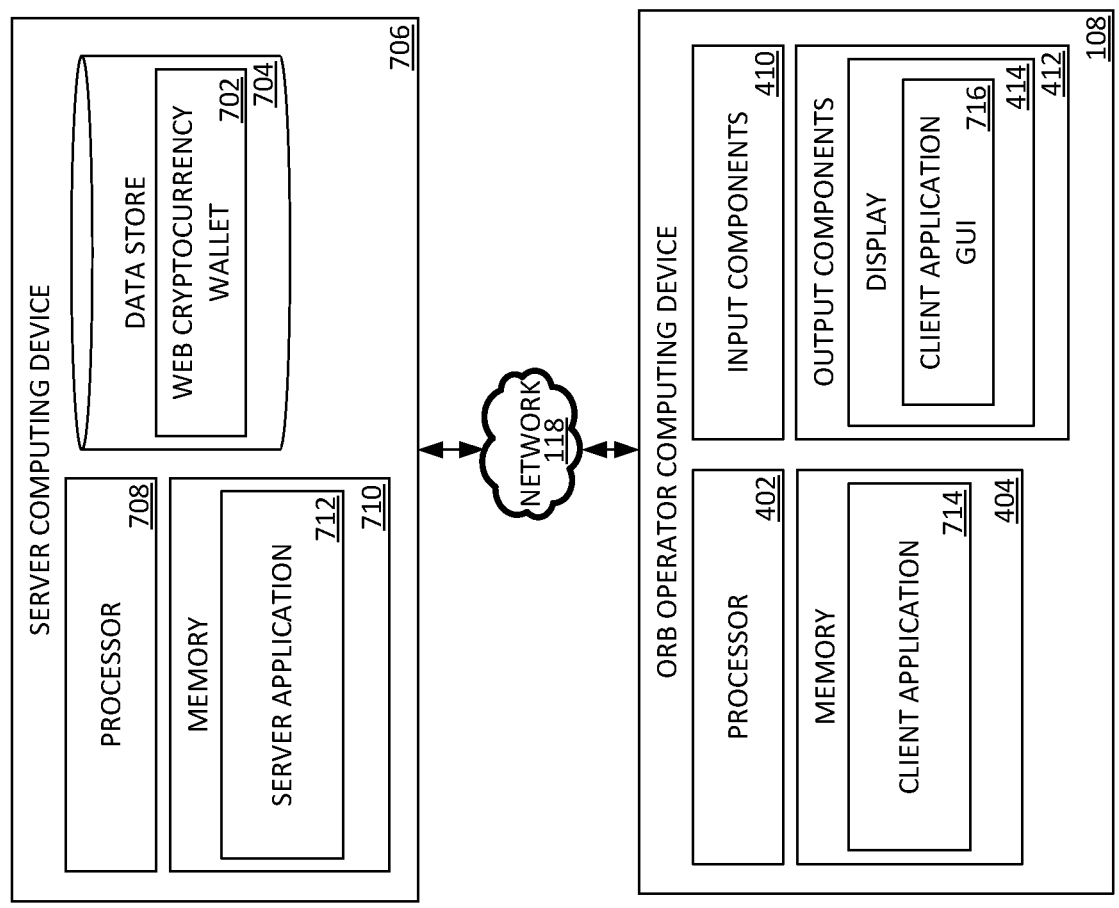
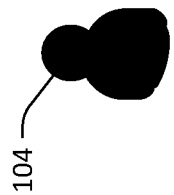
FIG. 7A

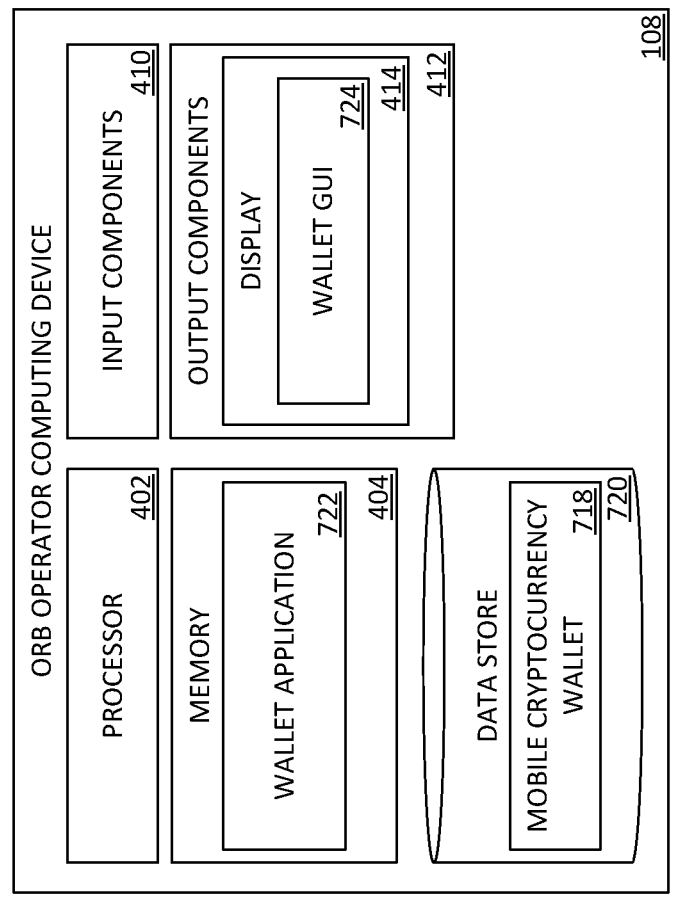
FIG. 7B

COMPUTING SYSTEM FOR DISTRIBUTING CRYPTOCURRENCY

BACKGROUND

A cryptocurrency airdrop is a computer-implemented distribution technique for cryptocurrency whereby amounts of cryptocurrency are transferred to wallets of users either for free or in return for a small promotional action (e.g., forwarding promotional materials to other users). Cryptocurrency airdrops are commonly used to promote awareness about a new cryptocurrency project. Conventionally, a cryptocurrency airdrop may require an email address of a user in order to prevent the user from receiving multiple amounts of cryptocurrency from the cryptocurrency airdrop. However, requiring an email address may be insufficient to prevent the user from receiving repeated amounts of cryptocurrency from the cryptocurrency airdrop.

SUMMARY

The following is a brief summary of subject matter that is described in greater detail herein. This summary is not intended to be limiting as to the scope of the claims.

Various technologies pertaining to distribution of cryptocurrency are described herein. With more particularity, a computing system is described herein that is configured to distribute cryptocurrency to a first user and a second user based upon a determination that the second user has not previously signed up to receive cryptocurrency. The computing system makes such a determination based upon a code (e.g., a 128-dimensional vector embedded code, also referred to herein as "an iris code") that is generated based upon an image of an iris of the second user that is captured by an iris scanning device that is under control of the first user (e.g., the first user is responsible for the iris scanning device). The computing system compares the code to a plurality of codes that have been generated based upon images of irises of a plurality of users and determines that the second user has not previously received cryptocurrency when the code is not included in the plurality of codes.

In an example, a first user receives permission to operate an iris scanning device. A person who receives permission to operate the iris scanning device may be referred to as "an orb operator" and the iris scanning device may be referred to as "an orb." As such, in the example, the first user is an orb operator who has permission to operate the orb. A first computing device operated by the first user receives input from the first user that causes a first two-dimensional barcode to be displayed on a display of the first computing device, where the first two-dimensional barcode is indicative of a cryptocurrency wallet of the first user. The iris scanning device captures an image of the first two-dimensional barcode, decodes the first two-dimensional barcode into data that is indicative of the cryptocurrency wallet of the first user (i.e., the data is derived from the first two-dimensional barcode), and transmits the data to a server computing device.

The first user is approached by a second user, where the second user wishes to receive cryptocurrency. The iris scanning device captures an image of an iris (or both irises or separate images of each iris) of the second user. The iris scanning device generates a code based upon the image of the iris and transmits the code to the server computing device. Upon receiving the code, the server computing device executes a search over a plurality of codes stored in a computer-readable data store, where the search is based upon the code received from the iris scanning device. Based upon search results for the search, the server computing device determines whether the code is included in the plurality of codes.

When the server computing device determines that the code is not included in the plurality of codes (e.g., the second user has not previously signed-up to receive cryptocurrency), the server computing device causes a first amount of cryptocurrency to be transferred to the cryptocurrency wallet of the first user and a second amount of cryptocurrency to be transferred to a cryptocurrency wallet of the second user. In an example, a second computing device of the second user displays a second two-dimensional barcode on a display, where the second two-dimensional barcode is indicative of a cryptocurrency wallet of the second user. The iris scanning device captures an image of the second two-dimensional barcode, decodes the second two-dimensional barcode into data that is indicative of the cryptocurrency wallet of the second user (i.e., the data is derived from the second two-dimensional barcode), and transmits the data to the server computing device. As the server computing device has determined that the second user has not previously signed-up to receive cryptocurrency, the server computing device transfers the first amount of cryptocurrency to the cryptocurrency wallet of the first user and the second amount of cryptocurrency to the cryptocurrency wallet of the second user. The server computing device then causes the code to be stored as part of the plurality of codes in the data store (to prevent the second user from receiving cryptocurrency from the server computing device more than once). When the server computing device determines that the code is included in the plurality of codes (e.g., the second user has previously signed-up to receive cryptocurrency), the server computing device causes an error message to be output on a display of at least one of the first computing device of the first user or the second computing device of the second user (i.e., the server computing device notifies one or both of the first user or the second user). Additionally or alternatively, the server computing device may cause the iris scanning device to output an indication as to whether or not the second user has previously signed up (e.g., the iris scanning device may output a red light to indicate that the second user previously signed up or a green light to indicate that the second user has not previously signed up). According to embodiments, the server computing device generates the cryptocurrency wallet of the second user upon determining that the code is not included in the plurality of codes.

The above-described technologies present various technical advantages over conventional technologies for distributing cryptocurrency. First, via generation of codes based upon irises of users and distributing cryptocurrency based thereon, the computing system described above ensures that the same user does not receive an award of cryptocurrency more than once. Thus, the above-described technologies tend to mitigate fraud. Furthermore, the actual images of the irises do not need to be retained once the codes have been generated, and as such, these images may be discarded to preserve user privacy. Second, by automatically generating a cryptocurrency wallet for a user upon determining that the user has not had his/her iris scanned previously, the above-described technologies enable users that are not familiar with cryptocurrency to participate in cryptocurrency projects.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7A-7C depict functional block diagrams of different types of cryptocurrency wallets.

DETAILED DESCRIPTION

Figure 1:
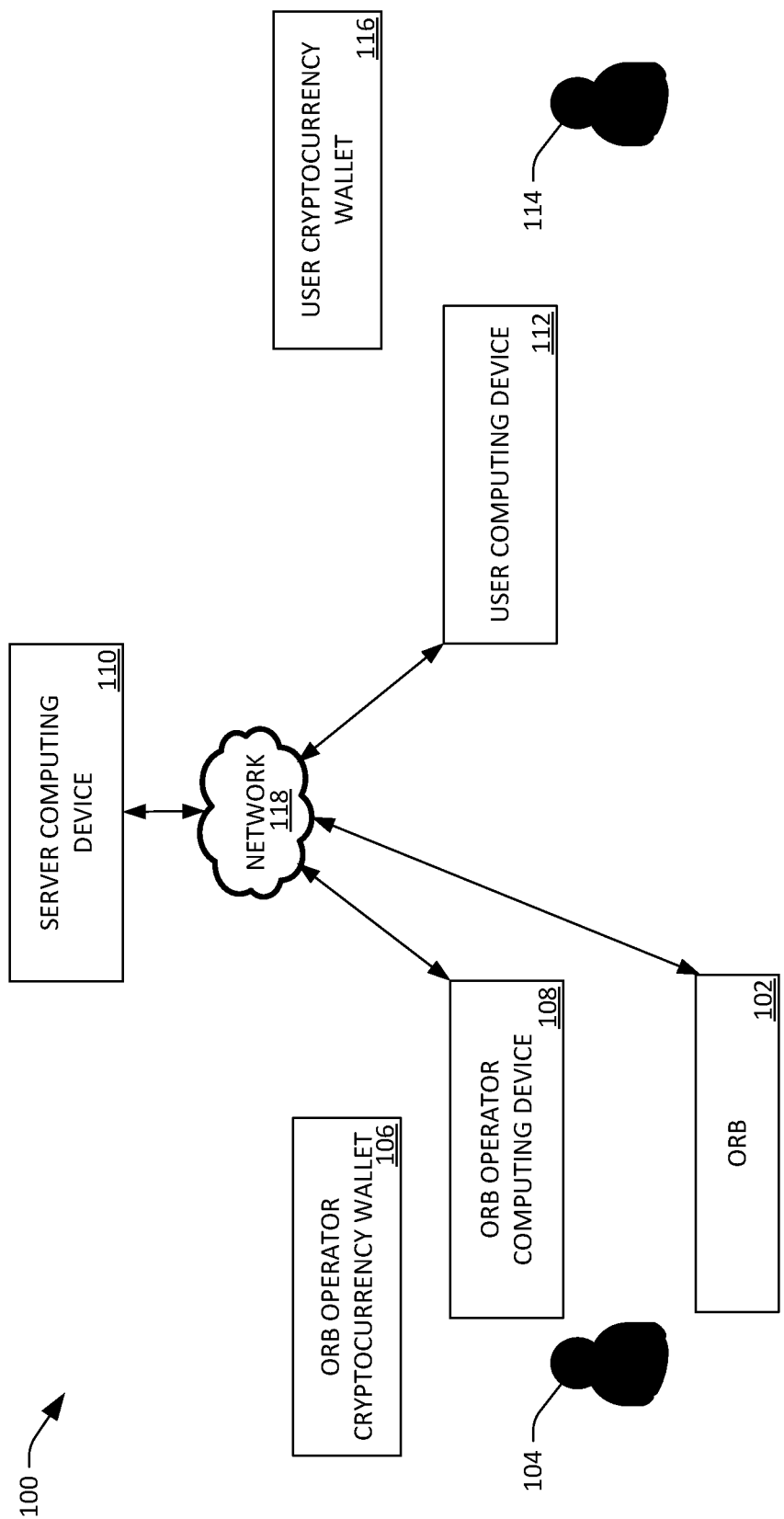
FIG. 1 is a functional block diagram of an exemplary computing environment that facilitates distribution of cryptocurrency.

Various technologies pertaining to cryptocurrency distribution are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

As noted above, conventional cryptocurrency airdrops lack sufficient safeguards for ensuring that a user does not receive a reward of cryptocurrency more than once. If a cryptocurrency airdrop requires a unique email address in order for a user to receive cryptocurrency, the user may utilize multiple different email addresses to receive repeated rewards of cryptocurrency to which he or she is not entitled. Even if a cryptocurrency airdrop requires a unique cryptocurrency wallet address in order for the user to receive cryptocurrency, the user may use different cryptocurrency wallet addresses to receive repeated rewards of cryptocurrency.

To address these issues, a first user receives permission to operate an iris scanning device. A person who receives permission to operate the iris scanning device may be referred to as "an orb operator" and the iris scanning device may be referred to as "an orb." As such, in the example, the first user is an orb operator who has permission to operate the orb. A first computing device operated by the first user receives input from the first user that causes a first two-dimensional barcode to be displayed on a display of the first computing device, where the first two-dimensional barcode is indicative of a cryptocurrency wallet of the first user. The iris scanning device captures an image of the first two-dimensional barcode, decodes the first two-dimensional barcode into data that is indicative of the cryptocurrency wallet of the first user (i.e., the data is derived from the first two-dimensional barcode), and transmits the data to a server computing device.

The first user is approached by a second user (or the second user approaches the first user), where the second user wishes to receive cryptocurrency. The iris scanning device captures an image of an iris (or both irises or separate images of each iris) of the second user. The iris scanning device generates a code (e.g., a 128-dimensional vector embedded code, also referred to herein as "an iris code") based upon the image of the iris and transmits the code to the server computing device. Upon receiving the code, the server computing device executes a search over a plurality of codes stored in a computer-readable data store, where the search is based upon the code received from the iris scanning device. Based upon search results for the search, the server computing device determines whether the code is included in the plurality of codes.

When the server computing device determines that the code is not included in the plurality of codes (e.g., the second user has not previously signed-up to receive cryptocurrency), the server computing device causes a first amount of cryptocurrency to be transferred to the cryptocurrency wallet of the first user and a second amount of cryptocurrency to be transferred to a cryptocurrency wallet of the second user. In an example, a second computing device of the second user displays a second two-dimensional barcode on a display, where the second two-dimensional barcode is indicative of a cryptocurrency wallet of the second user. The iris scanning device captures an image of the second two-dimensional barcode, decodes the second two-dimensional barcode into data that is indicative of the cryptocurrency wallet of the second user (i.e., the data is derived from the second two-dimensional barcode), and transmits the data to the server computing device. As the server computing device has determined that the second user has not previously signed-up to receive cryptocurrency, the server computing device transfers the first amount of cryptocurrency to the cryptocurrency wallet of the first user and the second amount of cryptocurrency to the cryptocurrency wallet of the second user. The server computing device then causes the code to be stored as part of the plurality of codes in the data store (to prevent the second user from receiving cryptocurrency from the server computing device more than once). When the server computing device determines that the code is included in the plurality of codes (e.g., the second user has previously signed-up to receive cryptocurrency), the server computing device causes an error message to be output on a display of at least one of the first computing device of the first user or the second computing device of the second user. According to embodiments, the server computing device generates the cryptocurrency wallet of the second user upon determining that the code is not included in the plurality of codes.

The above-described technologies present various technical advantages over conventional technologies for distributing cryptocurrency. First, via generation of codes based upon irises of users and distributing cryptocurrency based thereon, the above-described technologies ensure that the same user does not receive an award of cryptocurrency more than once. Thus, the above-described technologies tend to mitigate fraud. Furthermore, the actual images of the irises do not need to be retained once the codes have been generated, and as such, these images may be discarded to preserve user privacy. Second, by automatically generating a cryptocurrency wallet for the user upon determining that the user has not had his/her iris scanned previously, the above-described technologies enable users that are not familiar with cryptocurrency to participate in cryptocurrency projects.

With reference to FIG. 1, an exemplary computing environment 100 that facilitates distributing cryptocurrency is illustrated. The computing environment 100 includes an orb 102 (also referred to herein as "the iris scanning device 102") that is under control of an orb operator 104 (i.e., a person who has permission to control the orb 102 and/or who is responsible for the orb 102). As will be described in greater detail below, the orb 102 is configured to, inter alia, (1) capture images of irises of users, (2) generate codes based upon the images of the irises, and (3) capture images of two-dimensional barcodes that are indicative of cryptocurrency wallets (e.g., a cryptocurrency wallet of the orb operator 104, also referred to herein "the orb operator cryptocurrency wallet 106"). The orb operator cryptocurrency wallet 106 may be a mobile wallet, a desktop wallet, a hardware wallet, or a web wallet. Furthermore, the orb operator cryptocurrency wallet 106 may be a hot wallet that must be connected to the Internet or a cold wallet that is not connected to the Internet. The orb operator 104 may be a person who has received the right to operate the orb 102 by winning a bidding process with other users (e.g., the orb operator 104 is a primary orb operator) or the orb operator 104 may be a person who has been subcontracted by the primary orb operator to operate the orb 102 (e.g., the orb operator 104 is a secondary orb operator)

The computing environment 100 further includes an orb operator computing device 108 of the orb operator 104. The orb operator computing device 108 is configured to, inter alia, display a two-dimensional bar code that is indicative of the orb operator cryptocurrency wallet 106. The orb operator computing device 108 may be in communication with the orb 102 by way of a wired or wireless connection. Functionality of the orb operator computing device 108 will be explained in greater detail below.

The computing environment 100 further includes a server computing device 110. As will be explained in greater detail below, the server computing device 110 is configured to, inter alia, receive (1) codes that have been generated based upon images of irises of users, (2) determine whether the codes have been previously received by the server computing device 110, and (3) facilitate transfer of cryptocurrency upon determinations that the codes have not been previously received by the server computing device 110.

The computing environment 100 further includes a user computing device 112 that is operated by a user 114. As will be explained in greater detail below, the user computing device 112 is configured to, inter alia, display a two-dimensional barcode that is indicative of a cryptocurrency wallet of the user 114 (also referred to herein as "the user cryptocurrency wallet 116").

It is contemplated that the server computing device 110 is in communication with the orb 102, the orb operator computing device 108, and the user computing device 112 by way of a network 118 (e.g., the Internet). Communication between the server computing 110 and the orb 102, the orb operator computing device 108, and the user computing device 112 will be explained in detail below.

Figure 2:
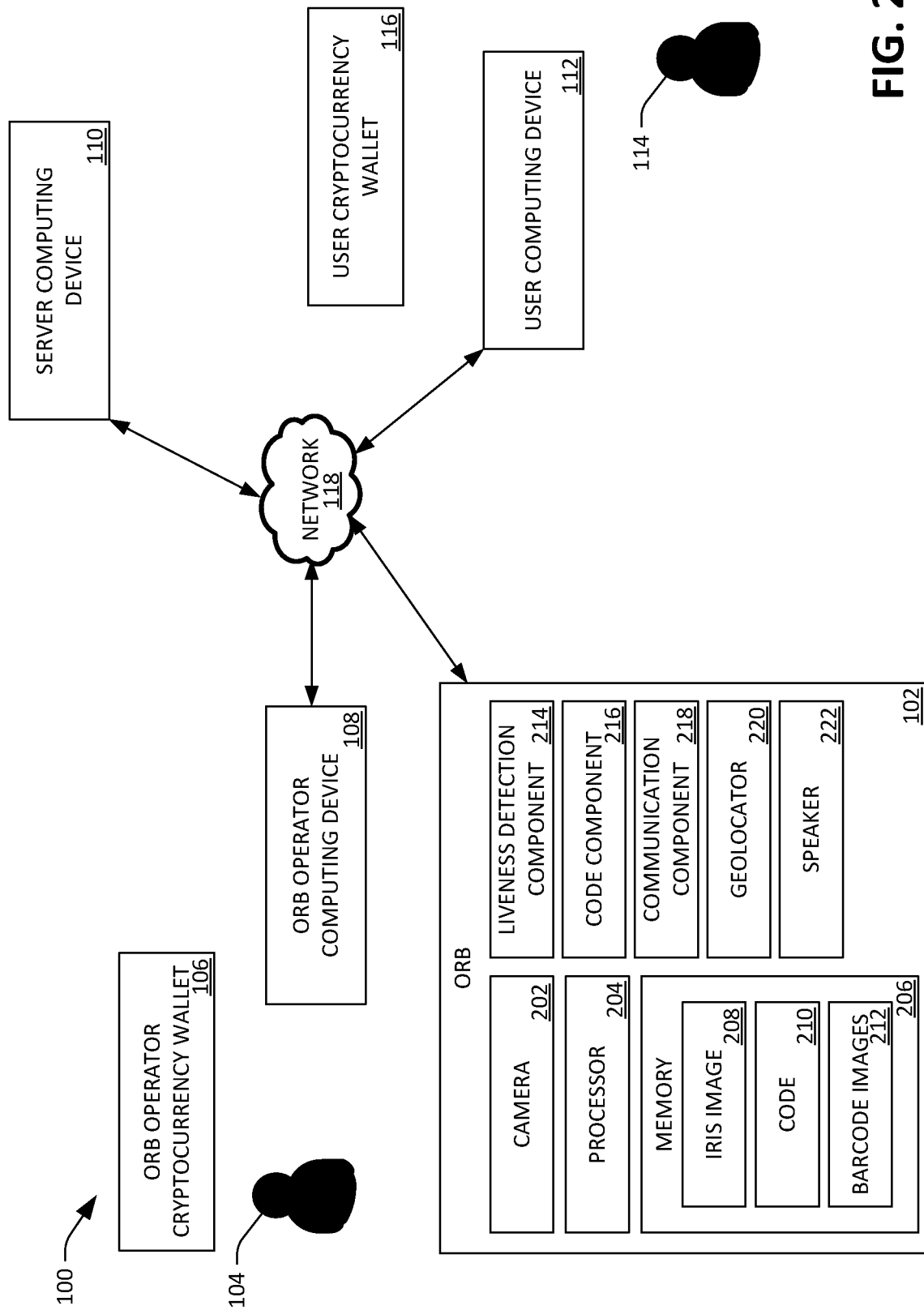
FIG. 2 depicts a functional block diagram of the orb in the computing environment of FIG. 1.

Referring now to FIG. 2, the orb 102 within the computing environment 100 is illustrated in further detail. According to some embodiments, the orb 102 is a spherical device. According to other embodiments, the orb 102 is non-spherical. The orb 102 includes at least one camera 202. According to embodiments, the orb 102 includes additional image acquisition devices (e.g., a red green blue (RGB) camera, an infrared camera, a three dimensional camera, etc. that aid in capturing images of iris of users. According to embodiments, the at least one camera 202 is configured (1) to capture images of irises of users and (2) to capture images of two-dimensional barcodes that are indicative of cryptocurrency wallets of users (e.g., the orb operator cryptocurrency wallet 106 and the user cryptocurrency wallet 116). According to embodiments, the at least one camera 202 comprises a first camera (e.g., an RGB blue camera) that captures an image of a face of a user and a second camera that captures an image of an iris of a user, where the image of the face of a user is used to align a mirror in order to facilitate capture of the image of the iris of the user by the second camera. According to embodiments, the at least one camera 202 comprises a first camera that is configured to capture the images of the irises of the users and a second camera that is configured to capture the images of the two-dimensional barcodes that are indicative of the cryptocurrency wallets of the users. According to embodiments, the orb 102 includes an illumination device (not shown in FIG. 2) that is configured to output light to illuminate faces and/or eyes of the users so as to facilitate capture of the images of the irises. The orb 102 further includes a processor 204 that is configured to carry out at least some of the functionality of the orb 102 (described in greater detail below).

The orb 102 includes memory 206. As will be described in greater detail below, the memory 206 stores an iris image 208 of the user 114 (also referred to herein as "the image of the iris 208 of the user 114") and a code 210 (also referred to herein as "the iris code 210") that is generated based upon the iris image 208. It is to be understood that the iris image 208 may an image of a single iris of the user 114 or an image of both irises of the user 114. It is also to be understand that the iris image 208 may comprise separate images of both irises of the user 114 (e.g., an image of the left iris of the user 114 and an image of the right iris of the user 114). The memory 206 also stores two-dimensional barcode images 212 (also referred to herein as "images of two-dimensional barcodes 212"), where the two-dimensional barcode images 212 are indicative of cryptocurrency wallets (e.g., the orb operator cryptocurrency wallet 106, the user cryptocurrency wallet 116, etc.). With more particularity, the two-dimensional barcode images 212 may be indicative of wallet addresses of the cryptocurrency wallets. According to embodiments, the iris image 208 is temporarily stored in the memory 206 during a session established between the orb operator 104 and the server computing device 110 and is removed from the memory 206 after the code 210 is generated.

According to embodiments, the orb 102 comprises a liveness detection component 214 that is implemented in hardware or software. The liveness detection component 214 is configured to determine that the user 114 is in proximity to the orb 102 when the orb 102 captures the image of the iris of the user 114 (as opposed to capturing an image of an image of the iris of the user 114).

The orb 102 further includes a code component 216 that is implemented in hardware or software. The code component 216 is configured to generate the code 210 based upon the iris image 208. In an example, the code component 216 applies a hashing function to pixel values of the iris image 208, thereby generating the code 210. According to embodiments, the code 210 is a 128-dimensional vector embedded code. According to embodiments, the code component 216 also digitally signs the code 210.

The orb 102 further includes a communication component 218 that is configured to enable the orb 102 to communicate with the server computing device 110 and/or the orb operator computing device 108. According to embodiments, the communication component 218 may be or include a Wi-Fi receiver, a Bluetooth Receiver, a Long Term Evolution (LTE®) module, and/or a Universal Serial Bus (USB) controller. According to embodiments, the orb 102 includes a geolocator 220, where the geolocator 220 is configured to enable a geographic location of the orb 102 to be ascertained. In an example, the geolocator 220 is a Global Positioning System (GPS) receiver. According to embodiments, the server computing device 110 transmits a location of the orb 102 to computing devices of potential users such that the users are able to physically travel to the orb 102 in order to have their irises scanned by the orb 102. The orb 102 may include a speaker 222 that is configured to output audible sounds to the orb operator 104 and/or the user 114. In an example, the audible sounds may indicate that the orb 102 encountered an error when attempting to capture an image of the iris of the user 114, that the orb 102 encountered an error when attempting to generate the code 210 based upon the image of the iris of the user 114. In another example, the audible sounds make indicate that the orb 102 is processing the image of the iris of the user 114 so as to generate the code 210. In yet another example, the audible sounds may indicate that user signup was successful or unsuccessful (to be explained in greater detail below). According to embodiments, the orb 102 may include an indicator light (not depicted in FIG. 2) that outputs visual indications as to whether signup of the user 114 was successful. In an example, when the user 114 has not previously signed up to receive cryptocurrency, the indicator light may output green light. In another example, when the user 114 has previously signed up to receive cryptocurrency, the indicator light may output red light. The indicator light may also output different colored lights (or patterns of light) to convey other information to users (e.g., that the orb is processing an image of the iris of the user 114).

Figure 3:
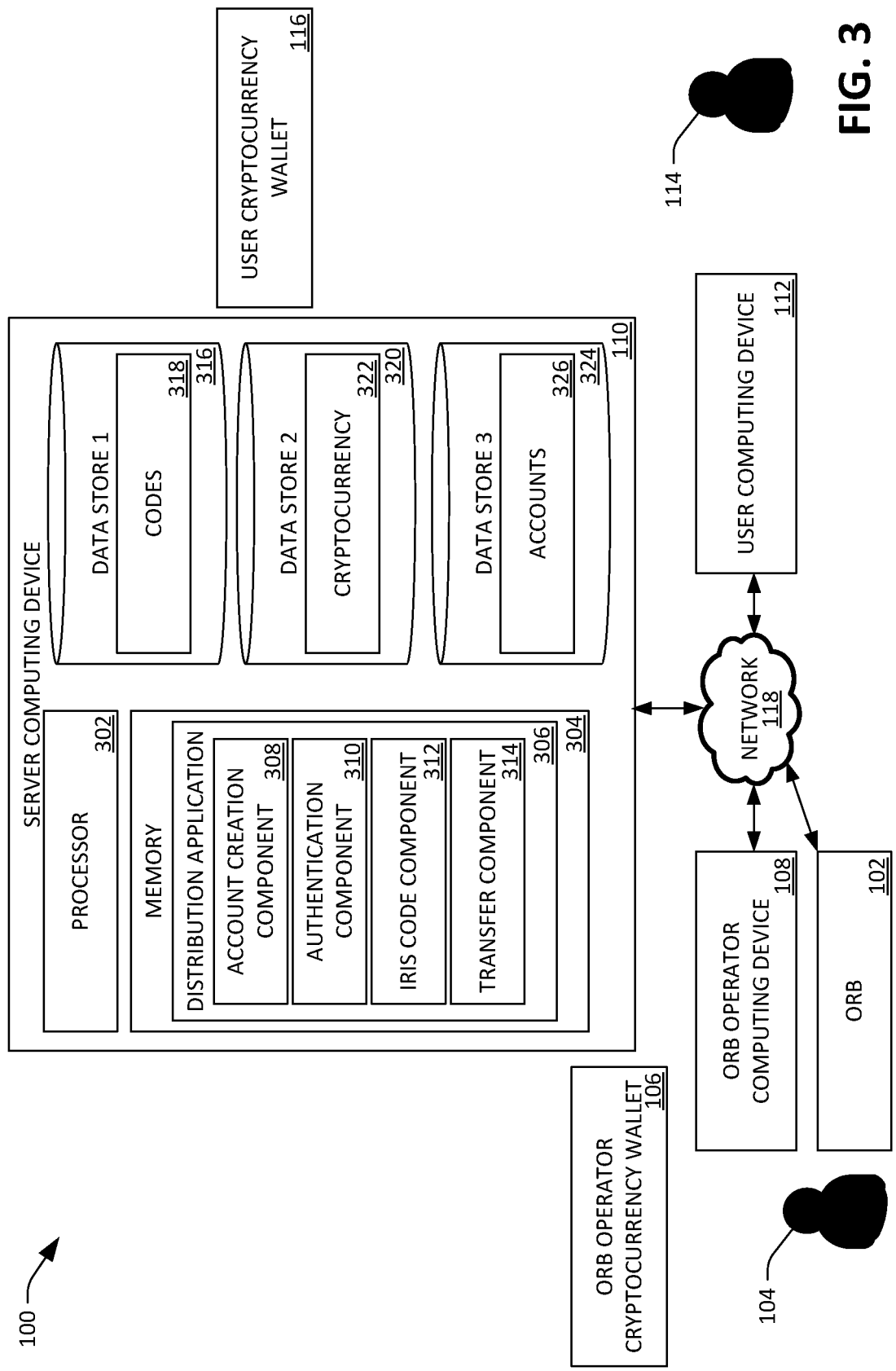
FIG. 3 depicts a functional block diagram of the server computing device in the computing environment of FIG. 1.

Referring now to FIG. 3, the server computing device 110 within the computing environment 100 is illustrated in further detail. The server computing device 110 includes a processor 302 and memory 304, where the memory 304 has a distribution application 306 loaded therein. As will be described in greater detail below, the distribution application 306 is configured, inter alia, (1) to determine whether or not the user 114 has previously signed up to receive cryptocurrency and (2) to transfer cryptocurrency to the user cryptocurrency wallet 116 and the orb operator cryptocurrency wallet 106 upon positive determination.

The distribution application 306 includes an account creation component 308. The account creation component 308 is configured to generate an account for the orb operator 104. The account creation component 308 may also be configured to generate an account for the user 114; however, it is to be understood that creation of an account for the user 114 is optional, that is, the user 114 may sign-up and receive cryptocurrency anonymously. The distribution application 306 includes an authentication component 310 that is configured to authenticate the orb operator 104 (as well as other orb operators) based upon authentication credentials received from the orb operator computing device 108. The authentication component 306 may also be configured to authenticate the user 114 when the user 114 creates an account.

The distribution application 306 further includes an iris code component 312 that is configured (1) to receive the code 210 that is generated based upon the iris image 208 of the user 114 and (2) to determine whether the user 114 has previously received cryptocurrency from the distribution application 306 based upon the code 210. The distribution application 306 further includes a transfer component 314 that is configured to transfer cryptocurrency into the orb operator cryptocurrency wallet 106 and the user cryptocurrency wallet 116.

The server computing device 110 further includes a first data store 316 that stores a plurality of codes 318 (also referred to herein as a plurality of iris codes), where each code in the plurality of codes 318 is generated based upon an image of an iris (or irises) of a different user. In an example, each of the plurality of codes 318 are a 128-dimensional vector embedded code. The server computing device 110 further includes a second data store 320 that stores cryptocurrency 322. According to embodiments, smart contracts execute in order to effectuate the transfer of the cryptocurrency 322 to the orb operator cryptocurrency wallet 106 and the user cryptocurrency wallet 116. The server computing device 110 additionally includes a third data store 324 that stores accounts 326 for orb operators (including the orb operator 104). An example account for the orb operator 104 includes a full name of the orb operator 104, contact information of the orb operator 104 (e.g., an email address, a telephone number, etc.), an identifier for a primary orb operator of the orb 102 when the orb operator 104 is not a primary orb operator, identifiers for secondary orb operators associated with the orb operator 104, an identifier for the orb 102, an address of the orb operator cryptocurrency wallet 106, and/or an identifier for a region in which the orb operator 104 operates. The accounts 326 may also include accounts for users (e.g., the user 114). An example account for the user 114 may include a full name of the user 114, contact information of the user 114 (e.g., an email address, a telephone number, etc.), and/or an address of the user cryptocurrency wallet 116.

Figure 4:
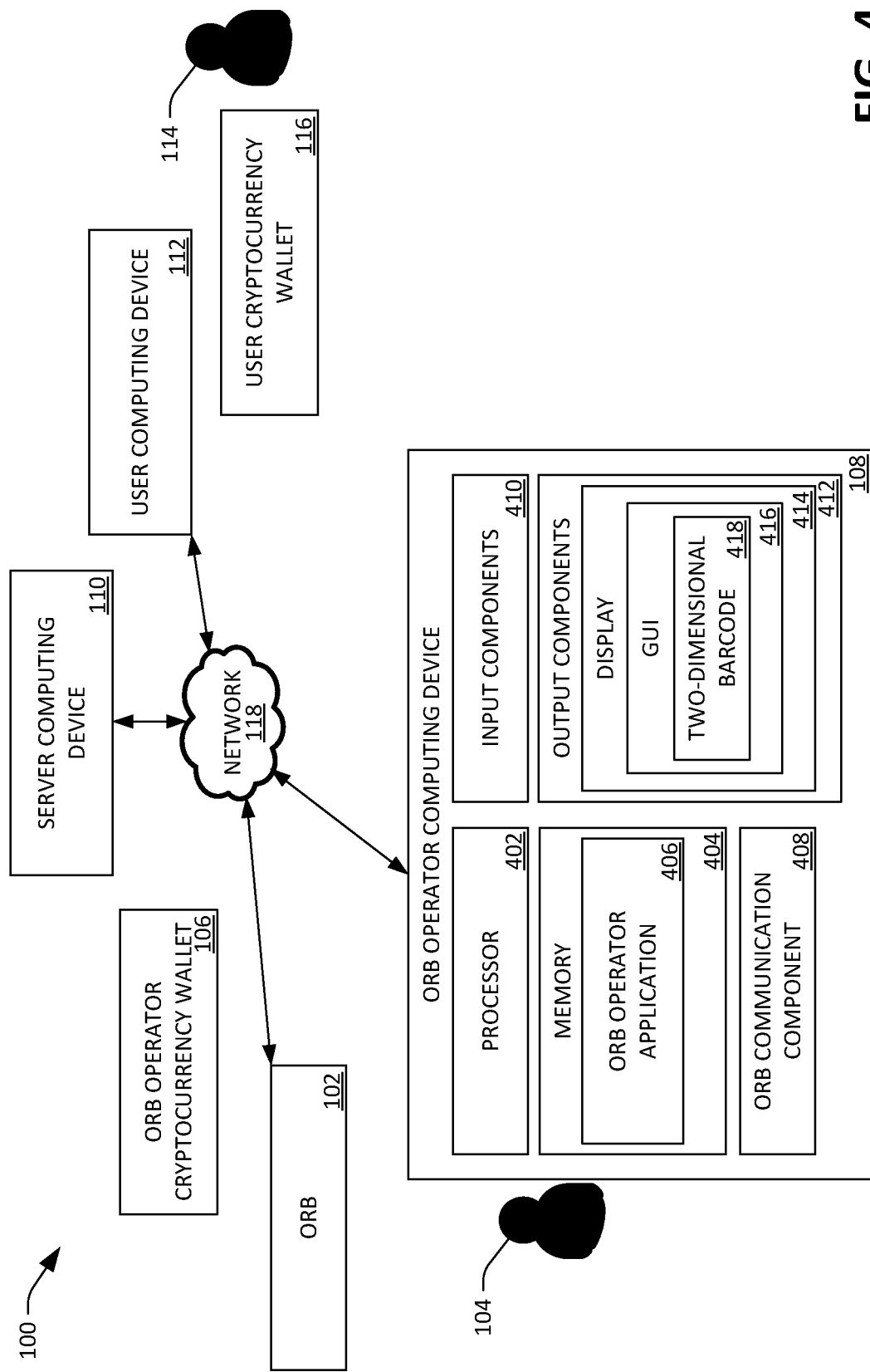
FIG. 4 depicts a functional block diagram of the orb operator computing device in the computing environment of FIG. 1.

Turning now to FIG. 4, the orb operator computing device 108 within the computing environment 100 is illustrated in further detail. According to embodiments, the orb operator computing device 108 is a mobile computing device, such as a smartphone or a tablet computing device. The orb operator computing device 108 includes a processor 402 and memory 404, where the memory 404 has an orb operator application 406 loaded therein (described in detail below). The orb operator computing device 108 may include an orb communication component 408 that enables the orb operator computing device 108 to communicate with the orb 102. According to embodiments, the orb communication component 408 is a Wi-Fi Radio, a Bluetooth radio, a Long Term Evolution (LTE®) module, or a USB controller.

The orb operator computing device 108 further includes input components 410 that enable the orb operator 104 to set forth input to the orb operator computing device 108. The input components 410 include one or more of a touchscreen, a track pad, a scroll wheel, and/or a keyboard. The orb operator computing device 108 further includes output components 412 that enable the orb operator computing device 108 to output information. The output components 412 include a display 414. The orb operator application 406 is configured to present a graphical user interface (GUI) 416 on the display 414, where the GUI 416 presents information pertaining to the orb operator 104 and/or the orb 102. According to embodiments, the GUI 416 displays a two-dimensional barcode 418 that is indicative of the orb operator cryptocurrency wallet 106. In an example, the two-dimensional barcode 418 is a quick response (QR) code.

Figure 5:
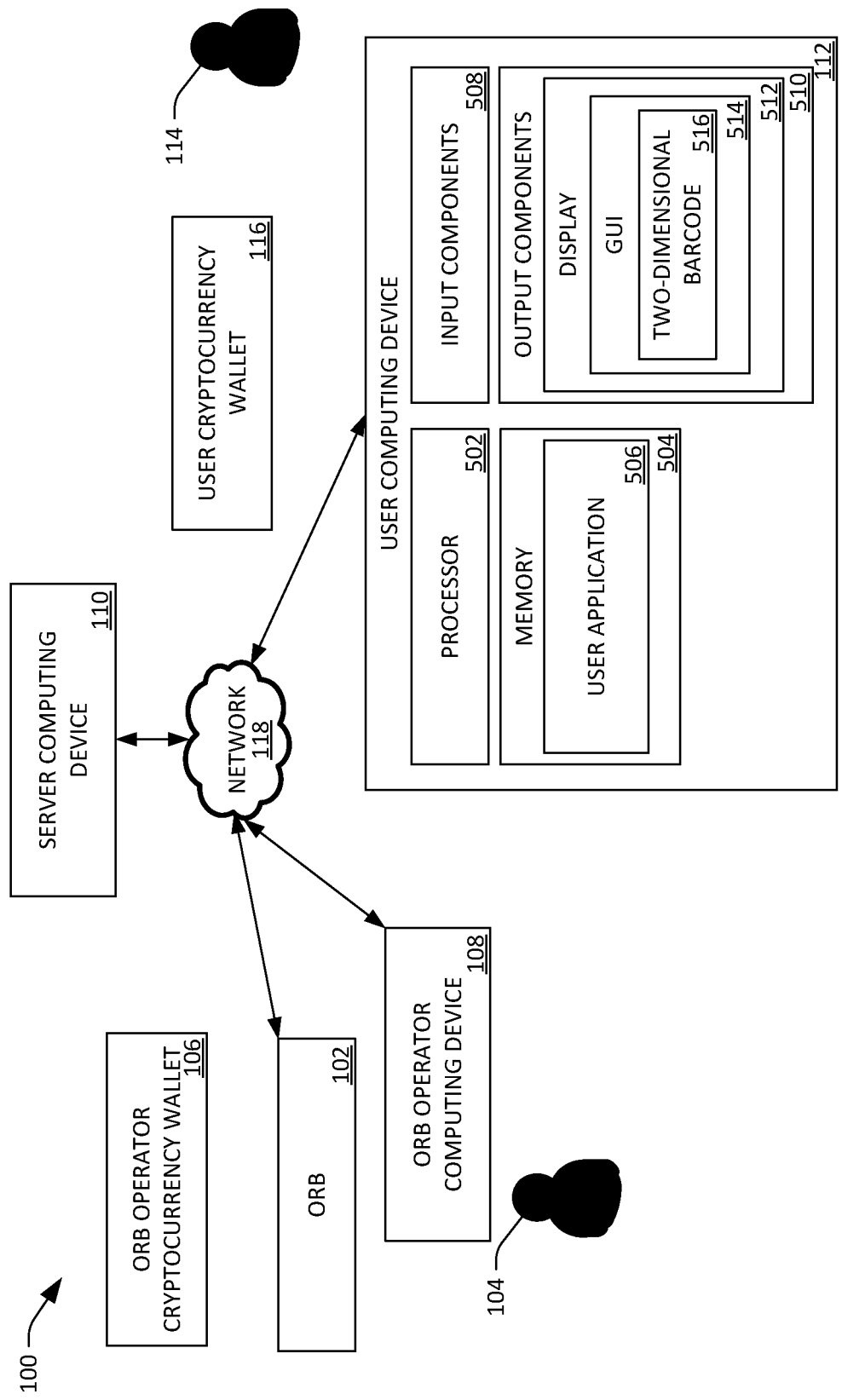
FIG. 5 depicts a functional block diagram of the user computing device in the computing environment of FIG. 1.

Turning now to FIG. 5, the user computing device 112 within the computing environment 100 is illustrated in further detail. According to embodiments, the user computing device 112 is a mobile computing device, such as a smartphone or a tablet computing device. The user computing device 112 includes a processor 502 and memory 504, where the memory 504 may include a user application 506 (described in greater detail below). The user computing device 112 includes input components 508 that enable the user 114 to set forth input to the user computing device 112. The input components 508 include one or more of a touchscreen, a track pad, a scroll wheel, and/or a keyboard. The user computing device 112 further includes output components 510 that enable the user computing device 112 to output information. The output components 510 include a display 512. The user application 506 is configured to present a GUI 514 on the display 512, where the GUI 514 presents information pertaining to the user 114. According to embodiments, the GUI 514 displays a two-dimensional barcode 516 that is indicative of the user cryptocurrency wallet 116. In an example, the two-dimensional barcode 516 is a quick response (QR) code.

With reference collectively now to FIGS. 1-5, exemplary operation of the computing environment 100 is now set forth. It is contemplated that the orb operator 104 has obtained the right to use the orb 102. In one example, the orb operator computing device 108 downloads the orb operator application 406 from an online application store (not depicted in FIGS. 1-5) and installs the orb operator application 406 on the orb operator computing device 108. Alternatively, the orb operator application 406 may be a web application that is accessed via a web browser executing on the orb operator computing device 108. The orb operator application 406 receives account creation information as input from the orb operator 104. The account creation information includes a full name of the orb operator 104, contact information of the orb operator 104, and login credentials (e.g., a username and password) for the orb operator 104. The account creation information may also include an address of the orb operator cryptocurrency wallet 106. The orb operator application 406 transmits the account creation information to the distribution application 306, where the account creation component 308 of the distribution application 306 creates an account for the orb operator 104 within the accounts 326 based upon the account creation information. According to some embodiments, the orb operator 104 is given the right to use the orb 102 upon creation of the account. According to other embodiments, the orb operator 104 participates in an auction through the orb operator application 406. When the orb operator 104 wins the auction, the orb operator 104 is granted the right to use the orb 102. In either case, the orb operator 104 obtains physical possession of the orb 102 (e.g., the orb 102 is delivered to a residence of the orb operator 104). According to embodiments where the orb operator 104 is a secondary orb operator, the account creation information includes an identifier for a primary orb operator of the orb 102. According to embodiments where the orb operator 104 is a tertiary orb operator, the account creation information includes an identifier for a secondary orb operator of the orb 102 (which in turn can be used to determine an identifier for the primary orb operator of the orb 102 due to the account for the secondary orb operator including an identifier for the secondary orb operator and an identifier for the primary orb operator).

It is then contemplated that the orb operator 104 interacts with the user 114. In an example, the orb operator 104 takes the orb 102 to a public location (e.g., a street, a mall, etc.) and asks the user 114 if the user 114 would be interested in obtaining cryptocurrency. When the user 114 is interested, the orb operator 104 instructs the user 114 to download the user application 506 from the online application store (not shown in FIGS. 1-5). Alternatively, the user application 506 may be web application that is accessed via a web browser executing on the user computing device 112. The user computing device 112 receives input from the user 114 which causes the user application 506 to be downloaded from the online application store and installed on the user computing device 112. According to embodiments, the user application 506 receives account creation information as input from the user 114. The account creation information for the user 114 may include a name of the user 114, contact information of the user 114, and login credentials (e.g., a username and password) for the user 114. The account creation information for the user 114 may also include an address of the user cryptocurrency wallet 116 when the cryptocurrency wallet 116 is a preexisting cryptocurrency wallet. The address of the user cryptocurrency wallet 116 may also be provided subsequent to creation of the account for the user 114. When the account creation information for the user 114 does not include an identifier for a cryptocurrency wallet, the user application 506 and the distribution application 306 communicate to automatically generate the user cryptocurrency wallet 116 (explained in greater detail below).

According to embodiments, prior to, concurrently with, or subsequent to interacting with the user 114, the orb operator application 406 (via the GUI 416) receives login credentials as input from the orb operator 104. The orb operator application 406 transmits the login credentials to the authentication component 310 of the distribution application 306. The authentication component 310 authenticates the orb operator 104 based upon the login credentials. Upon authenticating the orb operator 104, the authentication component 310 transmits data to the orb operator application 406 that causes the GUI 416 to be updated to display information pertaining to the orb operator 104 and/or the orb 102. The orb operator 104 turns the orb 102 on (e.g., by pressing a power switch on the orb 102). Upon the authentication and after the orb 102 has been powered on, the orb operator application 406 establishes communication with the orb 102 (e.g., via the communication component 218). The orb 102 also establishes communication with the server computing device 110 (e.g., via the communication component 218).

Figure 6:
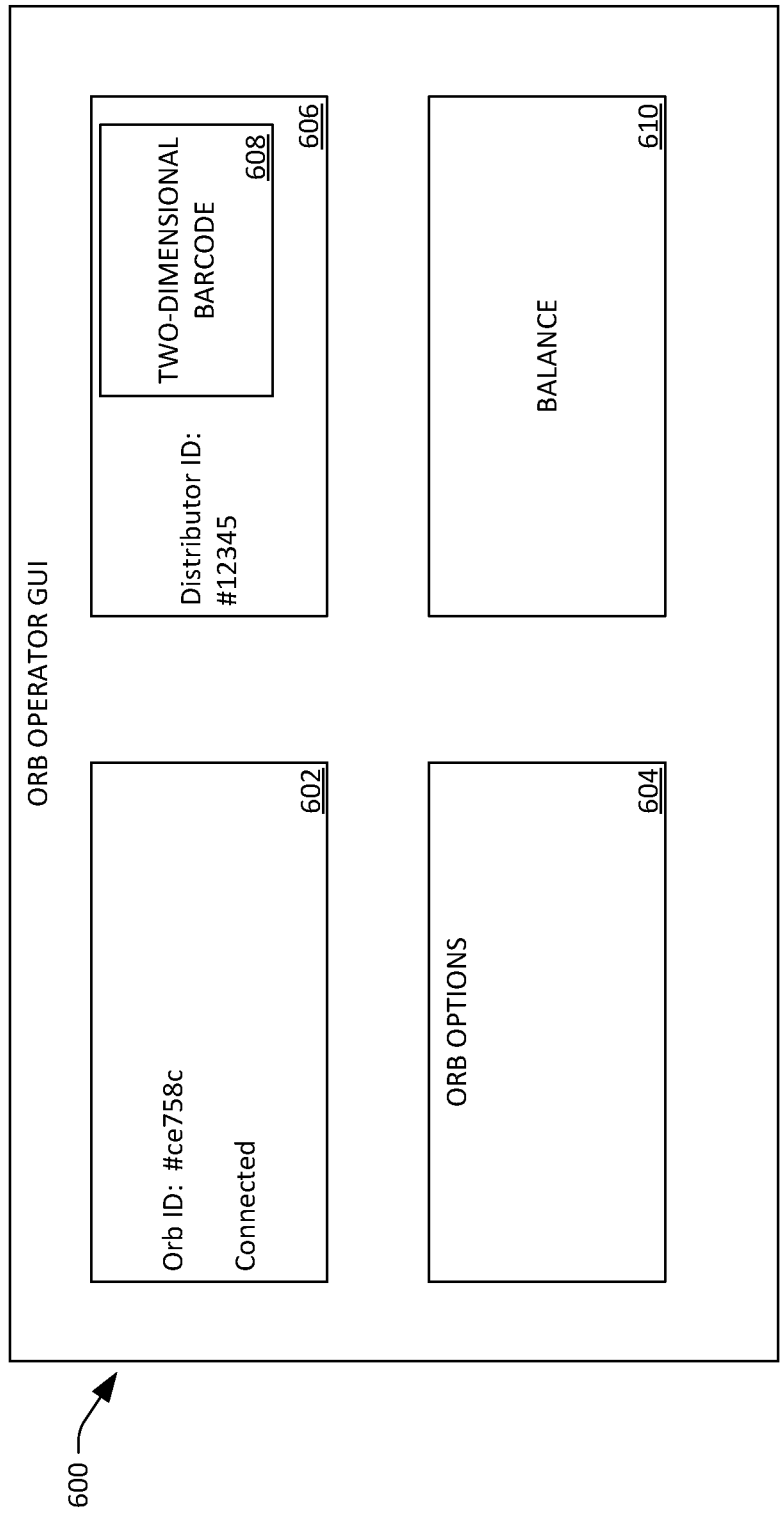
FIG. 6 depicts an exemplary graphical user interface (GUI) that is presented on a display of an orb operator computing device.

Turning briefly now to FIG. 6, an example GUI 600 of the orb operator application 406 that is presented on the display 414 of the orb operator computing device 108 is illustrated. The GUI 600 may be or include the GUI 416 or the GUI 416 may be or include the GUI 600. The GUI 600 includes a first region 602 that includes an identifier for the orb 102 and an indication that the orb 102 is connected to the orb operation application 406. The GUI 600 includes a second region 604 that includes options for the orb 102. The options may include a volume of the speaker 222 of the orb 102, an indication of remaining battery life of the orb 102, and/or an identifier for a wireless network that the orb 102 is connected to (so that the orb 102 may communicate with the server computing device 110). The GUI 600 includes a third region 606 that displays an identifier for the orb operator 104. According to embodiments, the third region 606 displays a two-dimensional barcode 608, where the two-dimensional barcode 606 is indicative of the orb operator cryptocurrency wallet 106. The two-dimensional barcode 606 may be the two-dimensional barcode 418. The GUI 600 further includes a fourth region 610 that displays a balance of cryptocurrency that the orb operator 104 has received.

Referring back to FIGS. 1-5, upon authentication of the orb operator 104, the orb operator application 406 displays, on the display 414, the two-dimensional barcode 418 that is indicative of the orb operator cryptocurrency wallet 106. The orb operator 104 positions the orb 102 such that the orb 102 captures an image of the two-dimensional barcode 418. The orb 102 decodes the image of the two-dimensional barcode 418 to obtain data, where the data is indicative of an address of the orb operator cryptocurrency wallet 106. The orb 102 transmits the data to the distribution application 306, whereupon the distribution application 306 establishes a session between the orb operator 104 and the orb 102 upon receiving the data.

The user application 506 receives an indication that the user 114 wishes to receive cryptocurrency. Upon receiving the indication, the user application 506 displays a consent agreement on the display 512, where the consent agreement indicates that the user 114 agrees to have his/her iris(es) scanned by the orb 102. The user application 506 receives input indicating that the user 114 agrees to the consent agreement. The user application 506 transmits a message to the distribution application 306, where the message indicates that the user 114 has agreed to the consent agreement. The distribution application 306 retains the message (e.g., as part of an account for the user 114 in the accounts 326 retained in the third data store 324). The distribution application 306 may transmit an indication to the orb operator application 406 indicating that the user 114 has consented to the iris scan, and the orb operator application 406 may present the indication to the orb operator 104 on the display 414.

The orb operator 104 positions the orb 102 such that the at least one camera 202 of the orb 102 is positioned proximate to irises of the user 114. In an example, the at least one camera 202 is located within one foot of the irises of the user 114. According to embodiments, the liveness detection component 214 determines that the user 114 is physically present within a vicinity of the orb 102. Upon determination that the user 114 is physically present, the at least one camera 202 captures the image 208 of the iris(es) of the user 114. The code component 216 of the orb 102 generates the code 210 based upon the image 208 of the iris(es) of the user 114 and stores the code in the memory 206. According to embodiments, the code 210 is a string of a fixed length that includes alphanumeric characters. According to some embodiments, the code 210 is an N-dimensional vector, where N is a positive integer greater than one. The communication component 218 of the orb 102 transmits the code 210 to the distribution application 306. Alternatively, the communication component 218 of the orb may transmit the code 210 to the orb operator application 408, whereupon the orb operator application 408 forwards the code 210 to the distribution application 306. According to embodiments, the orb 102 discards the code 210 and/or the iris image 208 from the memory 206 subsequent to transmitting the code 210 to the distribution application 306.

Upon receiving the code 210, the iris code component 312 of the distribution application 306 executes a search over the plurality of codes 318 stored in the first data store 316 based upon the code 210. The iris code component 312 determines whether the code 210 is included in the plurality of codes 318 based upon search results for the search. According to embodiments, the iris code component 312 computes distance metrics (e.g., Hamming Distance) between the code 210 and each of the plurality of codes 318. When a distance metric is below a threshold value, the iris code component 312 determines that the code 210 is included in the plurality of codes 318.

When the iris code component 312 of the distribution application 306 determines that the code 210 is not included in the plurality of codes 318 (i.e., the user 114 has not previously received cryptocurrency from the distribution application 306), the transfer component 314 transmits a message to the orb 102 indicating that the user 114 is to receive a first amount of cryptocurrency (from the cryptocurrency 322). According to embodiments, an indicator light on the orb 102 may output a visual indication (e.g., green light) indicating that the user 114 has not previously received cryptocurrency from the distribution application 306. According to embodiments where the user cryptocurrency wallet 116 is preexisting, the user 114 positions the user computing device 112 proximate to the at least one camera 202 of the orb 102 such that the two-dimensional barcode 516 (which is indicative of the user cryptocurrency wallet 116) shown on the display 512 is positioned within a field of view of the at least one camera 202. The at least one camera 202 captures an image of the two-dimensional barcode 516. The orb 102 decodes the image of the two-dimensional barcode 516 to obtain data, where the data is indicative of an address of the user cryptocurrency wallet 116. The orb 102 transmits the data to the distribution application 306, whereupon the transfer component 314 of the distribution application 306 transfers a first amount of cryptocurrency to the user cryptocurrency wallet 116 using the data (which, as noted above, serves as an address of the user cryptocurrency wallet 116). Alternatively, the orb 102 may transmit the data 516 to the orb operator application 406 and the orb operator application 406 may forward the data to the distribution application 306.

According to embodiments where the user cryptocurrency wallet 116 does not yet exist when the iris(es) of the user 114 are scanned by the orb, when the iris code component 312 of the distribution application 306 determines that the code 210 is not included in the plurality of codes 318 (i.e., the user 114 has not previously received cryptocurrency from the distribution application 306), the distribution application 306 causes the user cryptocurrency wallet 116 to be generated. With more particularity, the distribution application 306 causes a public key and a private key to be generated. The two-dimensional barcode 516 is generated from the public key and the private key is received by the user 114 (e.g., via the user computing device 112). The distribution application 306 causes the two-dimensional barcode 516 to be received by the user computing device 112 and the user computing device 112 presents the two-dimensional barcode 516 on the display 512. The at least one camera 202 captures an image of the two-dimensional barcode 516. The orb 102 decodes the image of the two-dimensional barcode 516 into data that is indicative of the user cryptocurrency wallet 116, transmits the data to the distribution application 306, and the first amount of cryptocurrency is transferred to the user cryptocurrency wallet 116 as described above.

Subsequent or concurrently with transferring the first amount of cryptocurrency to the user cryptocurrency wallet 116, the transfer component 314 of the distribution application 306 also transfers a second amount of cryptocurrency (from the cryptocurrency 322) to the orb operator cryptocurrency wallet 106 using the (previously received) image of the two-dimensional barcode 418 displayed on the display 414 of the orb operator computing device 108. In an example, the second amount of cryptocurrency is less than the first amount of cryptocurrency.

Subsequent to the first amount of cryptocurrency being transferred to the user cryptocurrency wallet 116, the user application 506 may update the GUI 514 to display a visual indication of the first amount of cryptocurrency that was transferred to the user cryptocurrency wallet 116. Similarly, subsequent to the second amount of cryptocurrency being transferred to the orb operator cryptocurrency wallet 106, the orb operator application 406 may update the GUI 416 to display a visual indication of the second amount of cryptocurrency that was transferred to the orb operator cryptocurrency wallet 106.

According to embodiments where the orb operator 104 is a secondary orb operator, the distribution application 306 also transfers a third amount of cryptocurrency to a cryptocurrency wallet of a primary orb operator based upon information included in the accounts 326. According to embodiments where the orb operator 104 is a tertiary orb operator, the distribution application 306 also transfers amounts of cryptocurrency to cryptocurrency wallets of the secondary orb operator and the primary orb operator based upon the information included in the accounts 326.

Subsequent or concurrently with transferring the first amount of cryptocurrency to the user cryptocurrency wallet 116, the distribution application 306 causes the code 210 to be stored in the first data store 316 as part of the plurality of codes 318. In this manner, the distribution application 306 ensures that users will not receive multiple amounts of cryptocurrency by signing up multiple times.

When the iris code component 312 of the distribution application 306 determines that the code 210 is included in the plurality of codes 318 (i.e., the user 114 has previously received cryptocurrency from the distribution application 306), the distribution application 306 outputs an error message to at least one of the orb operator computing device 108 or the user computing device 112, where the error message indicates that the user 114 has previously received cryptocurrency from the distribution application 306. The orb operator 406 and/or the user application 506 present the error message on the display 414 and/or the display 512, respectively. Additionally or alternatively, an indicator light of the orb 102 may output a visual indication (e.g., red light) that is reflective of the error message.

It is contemplated that the distribution application 306 may distribute cryptocurrency to multiple users during the session between the orb operator 104 and the orb 102 (without the orb 102 having to capture the image the image of the two-dimensional barcode 418 each time a new user receives cryptocurrency). In an example, during the session between the orb operator 104 and the orb 102, the distribution application 306 receives a second code from the orb 102, where the second code is generated based upon image of an iris of a third user (not shown in FIG. 1). The iris code component 312 executes a search over the plurality of codes 318 based upon the second code. The iris code component 312 determines whether the second code is included in the plurality of codes 318 based upon search results for the search. When the iris code component 312 determines that the second code is not included in the plurality of codes 318, the distribution application 306 causes a third amount of cryptocurrency to be transferred to a cryptocurrency wallet of the third user in a manner similar to that described above.

Although the distribution application 306 has been described above as creating an account for the user 114 in the accounts 326, other possibilities are contemplated. According to embodiments, the user 114 may receive cryptocurrency anonymously without creating an account. In an example, the user cryptocurrency wallet 116 is pre-existing (e.g., not created via the distribution application 306). The orb operator application 406 receives an indication from the orb operator 104 that the user 114 wishes to sign-up anonymously. The user computing device 112 displays the two-dimensional barcode 516 corresponding to the user cryptocurrency wallet 116 on the display 512. The orb 102, the orb operator computing device 108, and the server computing device 110 operate as described above. When the distribution application 306 has not previously distributed cryptocurrency to the user 114, the distribution application 306 causes the first amount of cryptocurrency to be transferred to the user cryptocurrency wallet 116.

It is to be understood that the above-described processes may also be utilized as part of a sign-up process for the orb operator 104 in which the orb operator 104 receives cryptocurrency for the first time (e.g., prior to sign-up of the user 114). For instance, the orb 102 can capture an image of an iris of the orb operator 104, generate a code based upon the image, and transmit the code to the server computing device 110, whereupon the server computing device 110 can determine whether the code is included in the plurality of codes 318 as described above. When the code is not included in the plurality of codes 318, the distribution application 306 can transfer an amount of cryptocurrency to the orb operator cryptocurrency wallet 106 (described above) and can add the code to the plurality of codes 318.

Figure 7C:
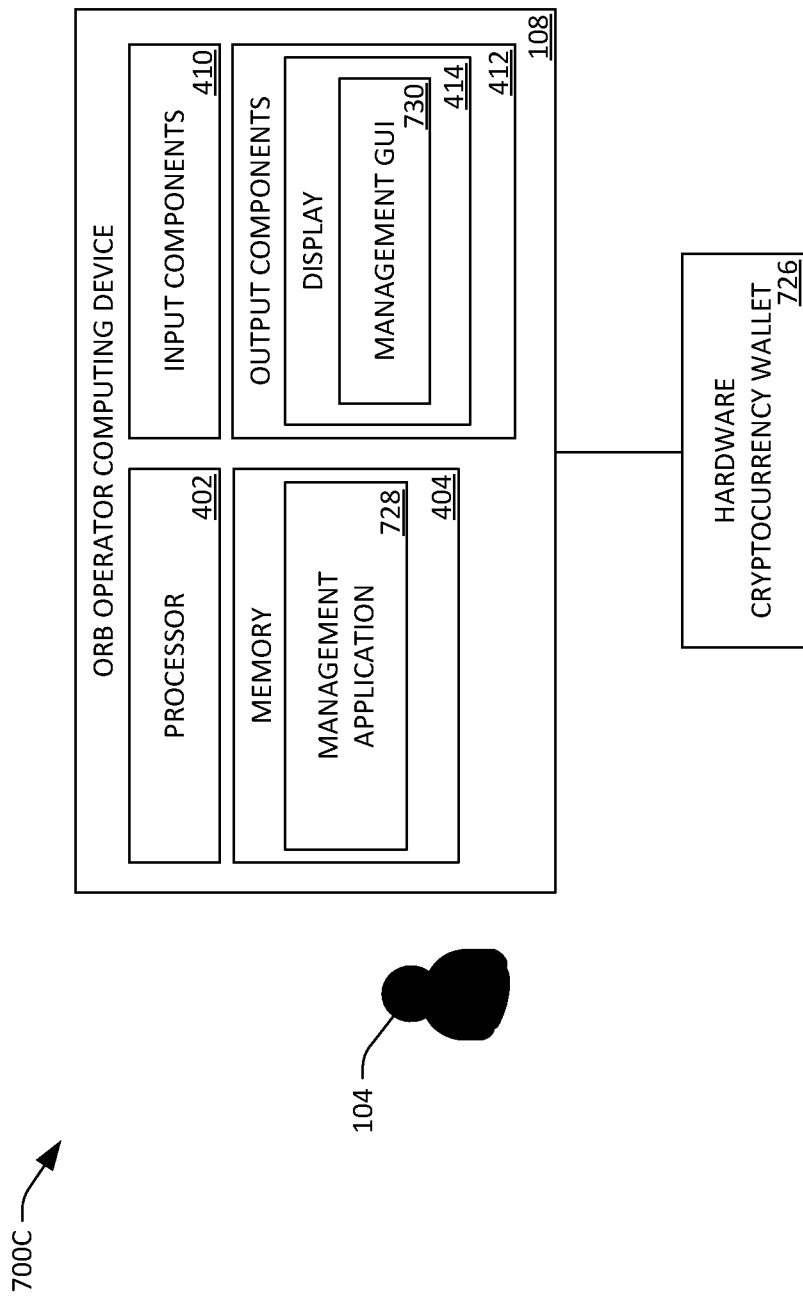

FIGS. 7A-C depicts different example implementations of cryptocurrency wallets that may be used in accordance with the technologies described above. Turning now to FIG. 7A, a computing environment 700A that includes a web cryptocurrency wallet 702 stored in a data store 704 is illustrated. The web cryptocurrency wallet 702 may be the orb operator cryptocurrency wallet 106 or the user cryptocurrency wallet 116. The computing environment 700A includes a server computing device 706. According to embodiments, the server computing device 706 is or includes the server computing device 110. The server computing device 706 includes a processor 708 and memory 710, where the memory 710 has a server application 712 loaded therein. The server application 712 enables the orb operator 104 to manage cryptocurrency stored in the web cryptocurrency wallet 702.

In the computing environment 700A, the memory 404 of the orb operator computing device 108 includes a client application 714 that is configured to communicate with the server application 712 over the network 118 to enable the orb operator to manage cryptocurrency stored in the web cryptocurrency wallet 702. According to embodiments, the client application 714 is the orb operator application 406 or the user application 506. The client application 714 is also configured to present a client application GUI 716 on the display 414, where the client application GUI 716 displays information from the web cryptocurrency wallet 702.

Referring now to FIG. 7B, a computing environment 700B that includes a mobile cryptocurrency wallet 718 stored in a data store 720 of the orb operator computing device 108 is illustrated. The mobile cryptocurrency wallet 718 may be the orb operator cryptocurrency wallet 106 or the user cryptocurrency wallet 116. In the computing environment 700B, the memory 404 of the orb operator computing device 108 includes a wallet application 722. The wallet application 722 presents a wallet GUI 724 that enables the orb operator 104 to manage the mobile cryptocurrency wallet 718.

Turning now to FIG. 7C, a computing environment 700C that includes a hardware cryptocurrency wallet 726 is illustrated. The hardware cryptocurrency wallet 726 is computer-readable storage that is separate from the orb operator computing device 108. The hardware cryptocurrency wallet 726 may be in wired or wireless communication with the orb operator computing device 108. In the computing environment 700C, the orb operator computing device 108 includes a management application 728 that enables the orb operator 104 to interact with the hardware cryptocurrency wallet 726 when the hardware cryptocurrency wallet 726 is connected to the orb operator computing device 108. The management application 728 may display a management GUI 730 that presents information about the hardware cryptocurrency wallet 726 when the hardware cryptocurrency wallet 726 is connected to the orb operator computing device 108.

Figure 8:
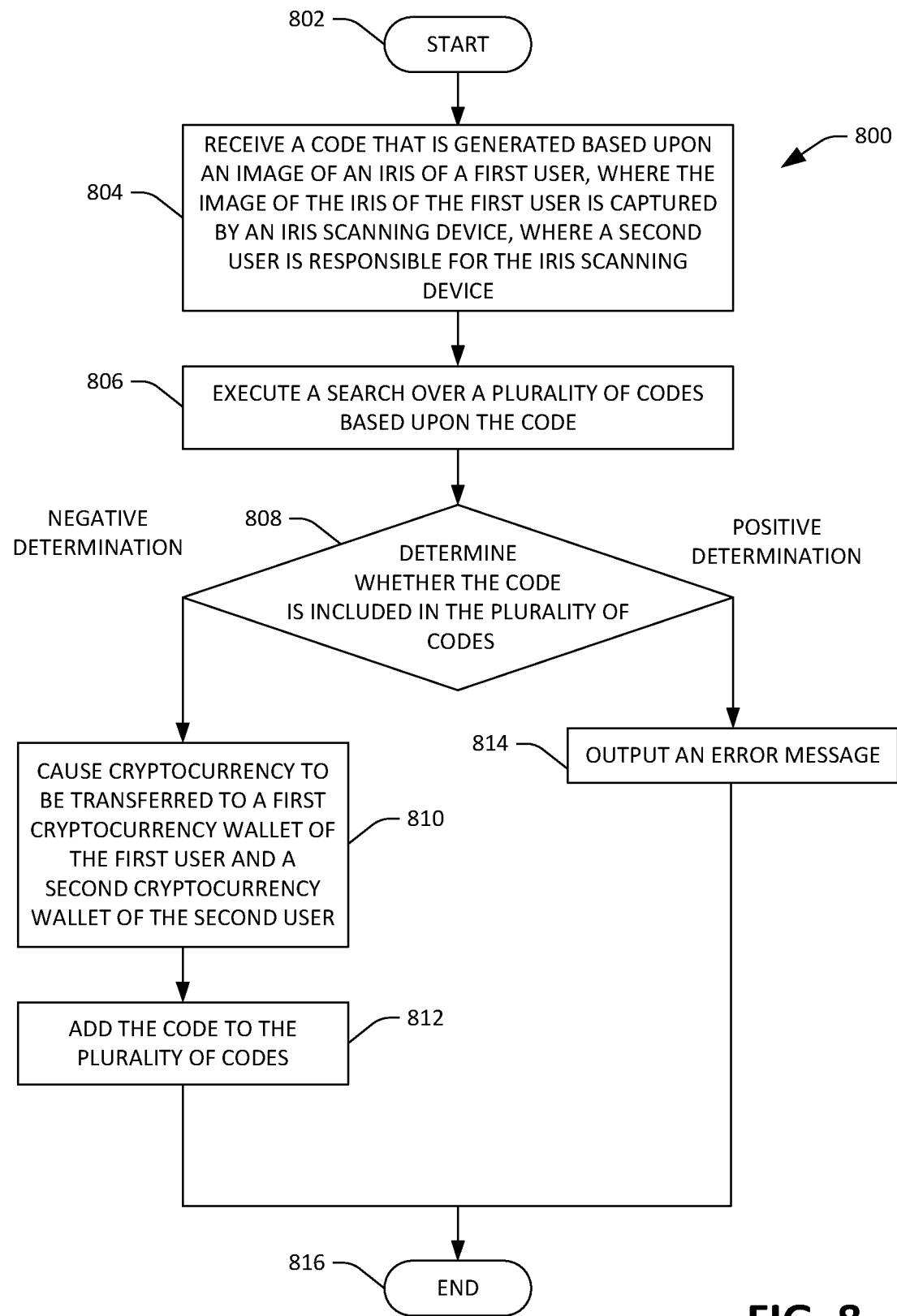
FIG. 8 is a flow diagram that illustrates an exemplary methodology performed by a server computing device that facilitates distributing cryptocurrency.
Figure 9:
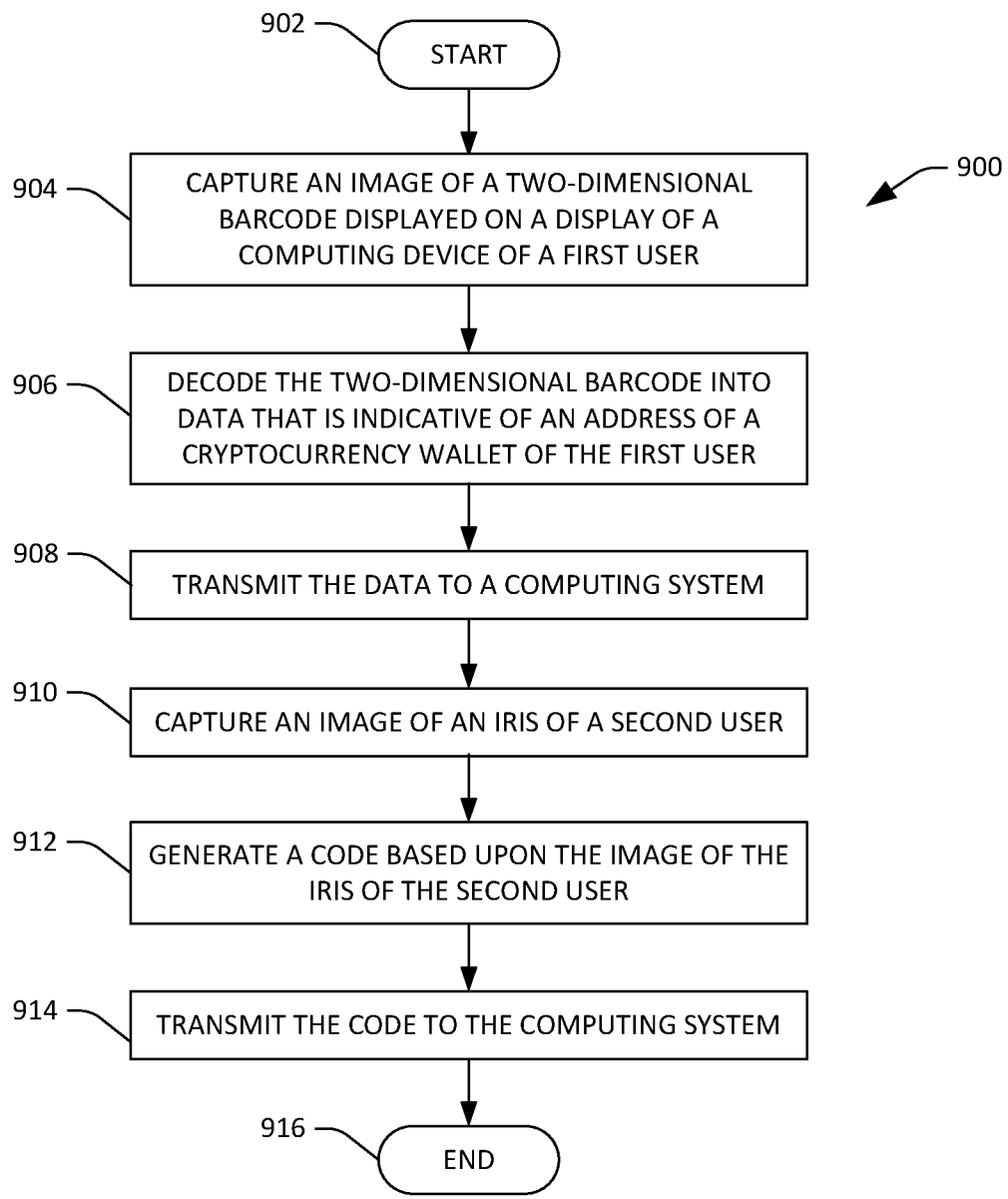
FIG. 9 is a flow diagram that illustrates an exemplary methodology performed by an iris scanning device that facilitates distributing cryptocurrency.

FIGS. 8 and 9 illustrate exemplary methodologies relating to distributing cryptocurrency. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 8, a methodology 800 performed by a server computing device that facilitates distributing cryptocurrency is illustrated. The methodology 800 begins at 802, and at 804, the server computing device receives a code that is generated based upon an image of an iris of a first user. The image of the iris of the first user is captured by an iris scanning device, where a second user is responsible for the iris scanning device. At 806, the server computing device executes a search over a plurality of codes. The plurality of codes are generated based upon images of irises of a plurality of users. At 808, the server computing device determines whether the code is included in the plurality of codes based upon search results for the search. At 810, upon negative determination (i.e., the code is not included in the plurality of codes), the server computing device causes cryptocurrency to be transferred to a first cryptocurrency wallet of the first user and a second cryptocurrency wallet of the second user (e.g., a first amount of cryptocurrency is transferred to the first cryptocurrency wallet and a second amount of cryptocurrency is transferred to the second cryptocurrency wallet). At 812, subsequent to transferring the cryptocurrency, the server computing device adds the code to the plurality of codes. At 814, upon positive determination (e.g., the code is included in the plurality of codes), the server computing device outputs an error message. The methodology 800 concludes at 816.

Turning now to FIG. 9, a methodology 900 performed by an iris scanning device that facilitates distributing cryptocurrency is illustrated. The methodology 900 begins at 902, and at 904, the iris scanning device captures an image of a two-dimensional barcode displayed on a display of a computing device of a first user, where the two-dimensional barcode is indicative of an address of a cryptocurrency wallet of the first user. The first user is responsible for the iris scanning device. At 906, the iris scanning device decodes the two-dimensional barcode into data that is indicative of the address of the cryptocurrency wallet of the first user. At 908, the iris scanning device transmits the data to a computing system. At 910, the iris scanning device captures an image of an iris of a second user. At 912, the iris scanning device generates a code based upon the image of the iris of the second user. At 914, the iris scanning device transmits the code to a computing system. The computing system determines whether the code is included in a plurality of codes stored in a data store. Upon negative determination, the computing system causes an amount of cryptocurrency to be transferred to a cryptocurrency wallet of the first user based upon the image of two-dimensional barcode. Upon positive determination, the computing system outputs an error message. The methodology 900 concludes at 916.

Figure 10:
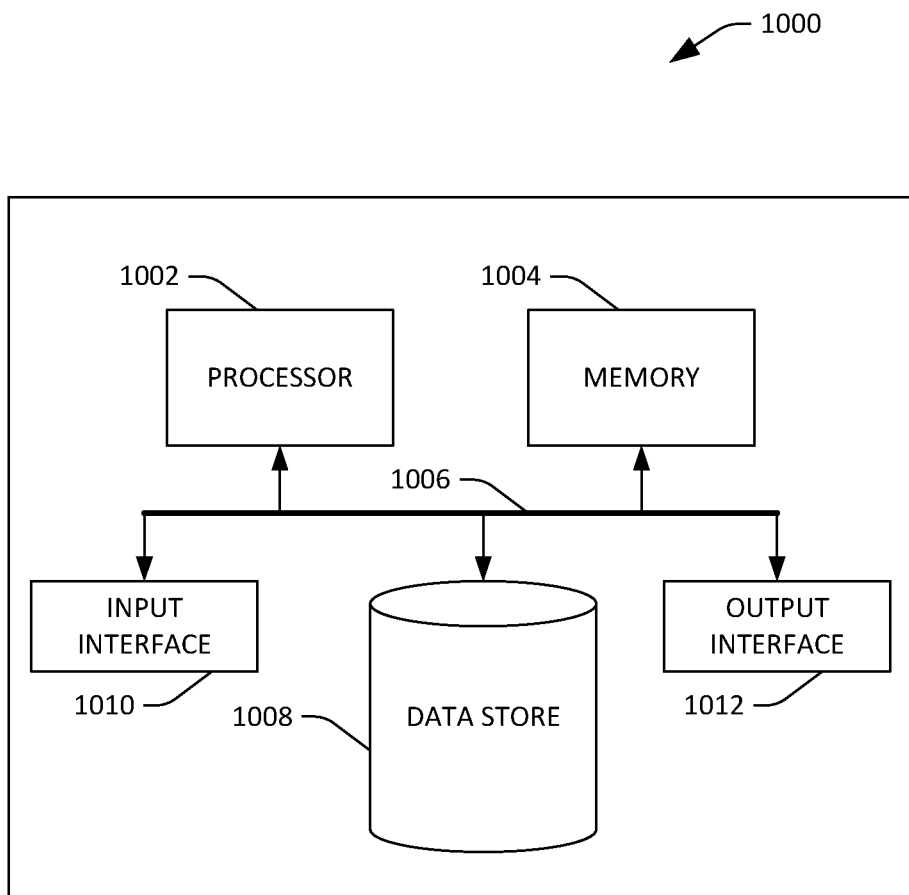
FIG. 10 is an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that distributes cryptocurrency. By way of another example, the computing device 1000 can be used in a system that displays a GUI that facilitates distribution of cryptocurrency. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store images of irises, images of two-dimensional barcodes, public and private keys associated with cryptocurrency, codes derived from images of irises, etc.

The computing device 1000 additionally includes a data store 1008 that is accessible by the processor 1002 by way of the system bus 1006. The data store 1008 may include executable instructions, images of irises, images of two-dimensional barcodes, public and private keys associated with cryptocurrency, codes derived from images of irises, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a processor; and
   memory storing instructions that, when executed by the processor, cause the processor to perform acts comprising:
   receiving, by way of a network, a code that is generated by an iris scanning device based upon an image of an iris of a first scanned user, wherein the image of the iris of the first scanned user is captured by way of the iris scanning device, wherein the iris scanning device discards the image of the iris of the first scanned user and the code generated based upon the image of the iris of the first scanned user responsive to transmission of the code, wherein a permitted operator is responsible for the iris scanning device such that the permitted operator is permitted to operate the iris scanning device for scanning irises of users other than the permitted operator;
   executing a search over a plurality of codes stored in a data store based upon the code generated based upon the image of the iris of the first scanned user, wherein the plurality of codes are generated based upon images of irises of a plurality of users;
   determining whether the code generated based upon the image of the iris of the first scanned user is included in the plurality of codes based upon search results for the search;
   based upon a determination that the code generated based upon the image of the iris of the first scanned user is not included in the plurality of codes, causing an amount of cryptocurrency to be transferred to a cryptocurrency wallet of the permitted operator, wherein the first scanned user and the permitted operator are different people and have different cryptocurrency wallets; and subsequent to causing the amount of cryptocurrency to be transferred to the cryptocurrency wallet of the permitted operator, causing the code generated based upon the image of the iris of the first scanned user to be included in the plurality of codes in the data store.

2. The computing system of claim 1, the acts further comprising:

based upon the determination that the code generated based upon the image of the iris of the first scanned user is not included in the plurality of codes, causing a second amount of cryptocurrency to be transferred to a cryptocurrency wallet of the first scanned user.

3. The computing system of claim 1, wherein the code is a hash of pixel values of the image of the iris of the first scanned user.

4. The computing system of claim 1, the acts further comprising:

prior to receiving the code that is generated based upon the image of the iris of the first scanned user, receiving, by way of the network, data derived from an image of a two-dimensional barcode from the iris scanning device, wherein the image of the two-dimensional barcode is displayed on a display of a computing device operated by the permitted operator; and upon receiving the data, opening a session between the permitted operator and the iris scanning device, wherein the acts of receiving the code, executing the search, determining whether the code is included in the plurality of codes, and causing the amount of cryptocurrency to be transferred to the cryptocurrency wallet of the permitted operator occur during the session.

5. The computing system of claim 4, wherein the two-dimensional barcode is indicative of an address of the cryptocurrency wallet of the permitted operator, wherein the amount of cryptocurrency is transferred to the cryptocurrency wallet of the permitted operator based upon the data received from the iris scanning device.

6. The computing system of claim 4, the acts further comprising:

during the session between the permitted operator and the iris scanning device:

receiving, by way of the network, a second code that is generated by the iris scanning device based upon a second image of a second iris of a second scanned user, wherein the second image of the second iris of the second scanned user is captured by way of the iris scanning device, wherein the iris scanning device discards the second image of the second iris of the second scanned user and the second code generated based upon the second image of the second iris of the second scanned user responsive to transmission of the second code;

executing a second search over the plurality of codes stored in the data store based upon the second code generated based upon the second image of the second iris of the second scanned user;

determining whether the second code generated based upon the second image of the second iris of the second scanned user is included in the plurality of codes based upon search results for the second search;

based upon a determination that the second code generated based upon the second image of the second iris of the second scanned user is not included in the plurality of codes, causing a second amount of cryptocurrency to be transferred the cryptocurrency wallet of the permitted operator, wherein the first scanned user, the second scanned user, and the permitted operator are different people and have different cryptocurrency wallets; and subsequent to causing the second amount of cryptocurrency to be transferred to the cryptocurrency wallet of the permitted operator, causing the second code generated based upon the second image of the second iris of the second scanned user to be included in the plurality of codes in the data store.

7. The computing system of claim 1, the acts further comprising:

based upon the determination that the code generated based upon the image of the iris of the first scanned user is not included in the plurality of codes, causing a second amount of cryptocurrency to be transferred to a cryptocurrency wallet of a second user, wherein the first scanned user, the second user, and the permitted operator are different people.

8. The computing system of claim 1, wherein the iris scanning device determines that the first scanned user is physically present in a proximity of the iris scanning device prior to the image of the iris of the first scanned user being captured by the iris scanning device.

9. A method executed by a processor of a computing system, the method comprising:

receiving, by way of a network, a code that is generated by an iris scanning device based upon an image of an iris of a first scanned user, wherein the image of the iris of the first scanned user is captured by way of the iris scanning device, wherein the iris scanning device discards the image of the iris of the first scanned user and the code generated based upon the image of the iris of the first scanned user responsive to transmission of the code, wherein a permitted operator is responsible for the iris scanning device such that the permitted operator is permitted to operate the iris scanning device for scanning irises of users other than the permitted operator;

executing a search over a plurality of codes stored in a data store based upon the code generated based upon the image of the iris of the first scanned user, wherein the plurality of codes are generated based upon images of irises of a plurality of users;

determining whether the code generated based upon the image of the iris of the first scanned user is included in the plurality of codes based upon search results for the search;

based upon a determination that the code generated based upon the image of the iris of the first scanned user is not included in the plurality of codes:

causing an amount of cryptocurrency to be transferred to a cryptocurrency wallet of the permitted operator, wherein the first scanned user and the permitted operator are different people and have different cryptocurrency wallets; and subsequent to causing the amount of cryptocurrency to be transferred to the cryptocurrency wallet of the permitted operator, causing the code generated based upon the image of the iris of the first scanned user to be included in the plurality of codes in the data store; and based upon a determination that the code generated based upon the image of the iris of the first scanned user is included in the plurality of codes, outputting an error message.

10. The method of claim 9, wherein determining whether the code is included in the plurality of codes comprises computing distance metrics between the code and each of the plurality of codes, wherein the code is determined to be included in the plurality of codes when a distance metric in the distance metrics is less than a threshold value.

11. The method of claim 9, wherein the error message is output to one or more of a computing device of the first scanned user or a computing device of the permitted operator.

12. The method of claim 9, further comprising:
prior to receiving the code that is generated based upon the image of the iris of the first scanned user, receiving, by way of the network, data derived from an image of a two-dimensional barcode from the iris scanning device, wherein the image of the two-dimensional barcode is displayed on a display of a computing device operated by the permitted operator, and further wherein the amount of cryptocurrency is transferred to the cryptocurrency wallet of the permitted operator second-user-based upon the data.

13. The method of claim 9, wherein the cryptocurrency wallet of the permitted operator is one of a web cryptocurrency wallet, a mobile cryptocurrency wallet, or a hardware cryptocurrency wallet.

14. The method of claim 9, further comprising:
based upon the determination that the code generated based upon the image of the iris of the first scanned user is not included in the plurality of codes, causing a second amount of cryptocurrency to be transferred to a cryptocurrency wallet of the first scanned user, wherein the second amount of cryptocurrency is greater than the amount of cryptocurrency.

15. The method of claim 9, further comprising:
subsequent to causing the amount of cryptocurrency to be transferred to the cryptocurrency wallet of the permitted operator, causing a graphical user interface (GUI) to be displayed on a display of a computing device of the permitted operator, wherein the GUI includes a visual indication that the amount of cryptocurrency has been transferred to the cryptocurrency wallet of the permitted operator.

16. The method of claim 15, wherein the computing device of the permitted operator is a smartphone or a tablet computing device.

17. The method of claim 9, wherein the code is a hash of pixel values of the image of the iris of the first scanned user.

18. A method executed by a processor of a computing system, the method comprising:
establishing a session between an orb operator and an iris scanning device, the orb operator is responsible for the iris scanning device such that the orb operator is permitted to operate the iris scanning device for scanning irises of users other than the orb operator;
during the session established between the orb operator and the iris scanning device:
receiving, by way of a network, a first code that is generated by the iris scanning device based upon a first image of a first iris of a first scanned user, wherein the first image of the first scanned user is captured by way of the iris scanning device, wherein the iris scanning device discards the first image of the first iris of the first scanned user and the first code generated based on the first image of the first iris of the first scanned user responsive to transmission of the first code;
executing a first search over a plurality of codes stored in a data store based upon the first code generated based upon the first image of the first iris of the first scanned user, wherein the plurality of codes are generated based upon images of irises of a plurality of users;
determining whether the first code generated based upon the first image of the first iris of the first scanned user is included in the plurality of codes based upon first search results for the first search;
based upon a determination that the first code generated based upon the first image of the first iris of the first scanned user is not included in the plurality of codes, causing a first amount of cryptocurrency to be transferred to a cryptocurrency wallet of the orb operator, wherein the first scanned user and the orb operator are different people and have different cryptocurrency wallets;
subsequent to causing the first amount of cryptocurrency to be transferred to the cryptocurrency wallet of the orb operator, causing the first code generated based upon the first image of the first iris of the first scanned user to be included in the plurality of codes in the data store;
receiving, by way of the network, a second code that is generated by the iris scanning device based upon a second image of a second iris of a second scanned user, wherein the second image of the second scanned user is captured by way of the iris scanning device, wherein the iris scanning device discards the second image of the second iris of the second scanned user and the second code generated based on the second image of the second iris of the second scanned user responsive to transmission of the second code;
executing a second search over the plurality of codes stored in the data store based upon the second code generated based upon the second image of the second iris of the second scanned user;
determining whether the second code generated based upon the second image of the second iris of the second scanned user is included in the plurality of codes based upon second search results for the second search; and
based upon a determination that the second code generated based upon the second image of the second iris of the second scanned user is not included in the plurality of codes, causing a second amount of cryptocurrency to be transferred to the cryptocurrency wallet of the orb operator, wherein the second scanned user and the orb operator are different people and have different cryptocurrency wallets;
subsequent to causing the second amount of cryptocurrency to be transferred to the cryptocurrency wallet of the orb operator, causing the second code generated based upon the second image of the second iris of the second scanned user to be included in the plurality of codes in the data store.

19. The method of claim 18, further comprising:
based upon the determination that the first code generated based upon the first image of the first iris of the first scanned user is not included in the plurality of codes, causing a third amount of cryptocurrency to be transferred to a second cryptocurrency wallet of the first scanned user; and based upon the determination that the second code generated based upon the second image of the second iris of the second scanned user is not included in the plurality of codes, causing a fourth amount of cryptocurrency to be transferred to a third cryptocurrency wallet of the second scanned user.

20. The method of claim 18, wherein the session between the orb operator and the iris scanning device is established based on data derived from an image of a two-dimensional barcode received from the iris scanning device, and wherein the image of the two-dimensional barcode is displayed on a display of a computing device operated by the orb operator.

* * * * *